(12) United States Patent
Hu

(10) Patent No.: US 6,463,541 B2
(45) Date of Patent: Oct. 8, 2002

(54) OBJECT AUTHENTIFICATION METHOD USING PRINTED BINARY CODE AND COMPUTER REGISTRY

(76) Inventor: Michael Hu, 04463 Liddicoat Cir., Los Altos Hills, CA (US) 94022

( * ) Notice: Subject to any disclaimer, the term of this patent is extended or adjusted under 35 U.S.C. 154(b) by 2 days.

(21) Appl. No.: 09/761,748

(22) Filed: Jan. 18, 2001

(65) Prior Publication Data

US 2002/0128979 A1 Sep. 12, 2002

(51) Int. Cl.$^7$ ................................................ G06F 12/14
(52) U.S. Cl. ........................... 713/200; 705/67; 705/51; 713/201
(58) Field of Search ................................. 713/200, 201, 713/188, 190, 176; 380/201, 202, 203; 283/70, 102, 58; 705/50, 51, 57, 58, 67

(56) References Cited

U.S. PATENT DOCUMENTS

| | | | | |
|---|---|---|---|---|
| 3,829,133 A | * | 8/1974 | Smagala-Romano | 283/6 |
| 5,267,314 A | * | 11/1993 | Stambler | 380/24 |
| 5,380,047 A | * | 1/1995 | Molee et al. | 283/86 |
| 5,912,974 A | * | 6/1999 | Holloway et al. | 380/51 |
| 6,006,328 A | * | 12/1999 | Drake | 713/200 |
| 6,185,686 B1 | * | 2/2001 | Glover | 713/190 |

FOREIGN PATENT DOCUMENTS

JP  408130554 A  *  5/1996

OTHER PUBLICATIONS

Acacia Research Subsidiary Sells CR–Recording Product to NTI Corp.; Jan. 17, 2001.*

* cited by examiner

*Primary Examiner*—Pierre E. Elisca
(74) *Attorney, Agent, or Firm*—Peter Gibson

(57) ABSTRACT

A binary code printed upon documents and articles includes: an origin code referring to pertinent data including category, creator identity, creation time; and an algorithm derived authentification code based upon the origin code. A world wide web (WWW) accessible registry provides authentification with input of the origin and authentification codes. A third ownership code possesses status which is similarly accessible. The authentification code is verified algorithmically from the origin code. Ownership code status indicates, at minimum, 'home' or 'field' for paper currency and 'inventory' or 'sold' for goods which status is only modifiable by authorized access. For suitable categories a secret code is available to the first purchaser after authorized release from inventory with WWW input of the printed origin and authentification binary code. This secret code is inaccessible without input of the full trinary code including the secret code. Ownership is hence verifiable and subsequent purchasers may replace the secret code with disclosure of the predecessor which capability verifies registered ownership.

61 Claims, No Drawings

OBJECT AUTHENTIFICATION METHOD USING PRINTED BINARY CODE AND COMPUTER REGISTRY

BACKGROUND OF THE INVENTION

1. Field of the Invention

This invention relates generally to methods of identifying printed matter, more particularly to fraud prevention or detection, and most specifically to record activated printed matter authentification and fraud prevention using a central trusted authority accessible via the world wide web.

2. General Background

Forgeries in four different broad categories are considered: (a) paper currency; (b) cheques and other financial notes; (c) manufactured goods; (d) works of art. Forgery in the first two groups requires imitation in a printed medium while forgery in the latter two groups requires imitation with appropriate means of manufacture. Paper currency is issued only by governments while authorized financial institutions are licensed in the issuance of cheques and other financial notes which are further associated with a particular private entity and signature(s) in attaining legitimacy. Manufactured goods are contrasted to works of art as being mass produced instead of being made singly which necessitates the use of line production rather than individual creation. Forgery is most commonly associated with either counterfeit currency or fraudulent works of art but is considered properly comprehensive of fake bond notes and 'knock offs' of manufactured goods.

The concern with forgery with regard to paper currency is readily discernable in the lengths to which governments extend various printing technologies including use of serial numbers, extremely fine lithography, use of detectable materials, and regulation of the stock from which the currency is made. The success of these methods is generally difficult to ascertain objectively, even by parties authorized to investigate counterfeiting, but the problem is considered persistent, with a long and rich history. Prior to the U.S. Civil War banks issued paper currency and it is estimated that by 1860 one third of all circulated paper currency was counterfeit. As a strategic economic attack upon the British the Pound Sterling was counterfeited on a grand scale in Operation Bernhardt by The Third Reich.

More recently it is conjectured that the volume of counterfeit U.S. $100 bills produced largely by opposed regimes has deterred the issuance of notes of greater value despite an inflation of ten fold since notes of greater denomination were discontinued. One perceives large cash transactions as being held in suspicion and indeed regulations require registration of cash deposits of $10,000 or greater among other measures. The fact that this amount requires one hundred notes of the largest denomination of currently available legal U.S. currency is not unnoticed, nor the observation that this is one but one third of the money required to buy an automobile now for one of comparable quality which required only three notes fifty years ago.

It is further observed that paper currency comprises a decreasingly smaller proportion of other monies, particularly funds held and transferred electronically, that electronically processed cards, charge, credit, and debit along with other means of electronic transfer including automatic teller assisted services, world wide web (WWW) accessible electronic banking, electronic debits from checking and other accounts, have become ordinary and routine in less than twenty years. It is considered publicly plausible that currency of the conventional variety will be wholly replaced by electronic means within another twenty years and that, at the present rate of marginalization, conventional currency will be largely irrelevant by that time unless supported by readily accessible electronic authentification means.

As regards the second category, cheques and other financial notes, forgery is considered a less pervasive problem than obtained with regard to paper currency, largely because the parties involved usually have means of authentication available which are simply considered worth the while in exercising. This is not to say that fraud and forgery of financial notes is not a problem nor that the means of authentification are considered wholly satisfactory but that this area is distinguished over the forgery of currency wherein the identity of the valid issuer is a given. It was mentioned earlier that paper currency in the form of bank notes prior to consolidation under federal auspices experienced enormous problems with forgery and that consolidation clearly operated to deter forgery. The same principle is expected to apply to financial notes wherein benefit might be obtained with a simpler system which would provide relatively quick and easy positive identification of the issuer of the bond, certificate, or other note concerned. A greater impetus to forgery is observed with regard to paper currency as opposed to financial notes because paper currency is circulated between people who do not routinely exercise much if any caution regarding the acceptance of the note as genuine.

With regard to forgeries of manufacture the distinction between mass production and works of art has been proposed as a basis for useful categorization. With regard to the magnitude of the problems involved in these two areas it is suggested that the level of concern with fraudulent manufacture in mass produced product is commensurate with the importance of the patent system. For while patents are intended to protect and thereby promote innovation, the benefit to the patent holder is a monopoly limited in time to the product developed. The trademark system clearly reflects the extent of the damage which would obtain without the ability to identify one company from another with respect to their products and services. Design patents protect only the appearance of a product, and copyright only against verbatim reproduction, but both are considered valuable defenses against 'knock off' product which pretends to be of a manufacture it is not.

Works of art are perhaps the most dramatic if most difficult category to assess with respect to the magnitude of the problem posed by forgery. The practice is obviously prevalent as the common epigram 'buyer beware' connotes. Aside from forgery outright the question of rightful ownership is considered another vast problem endemic to all areas concerned if more readily recognizable in the areas of mass produced goods and works of art. In cases of establishing rightful ownership the identities of the parties may be peripherally involved but the identity of the object is considered central. One may easily insure a valuable painting by a well known artist or a valuable automobile of which only a few thousand were made and the thief of the object may have a considerable problem in selling the stolen object unless the identify of the same can be obscured. The most frequently stolen cars in the U.S. are among those models with the highest sales figures because these cars can be taken apart in a 'chop shop' and sold piecemeal while essentially obliterating the identity of the vehicle. Rather than stealing a painting by a famous artist, for another example, the prospect of imitating the work of the same and affixing a facsimile of that famous artist's signature upon the forgery may become a relatively attractive prospect. These observations are considered to point to the main problem underlying all areas of forgery and fraud: the difficulty in positively identifying the object, i.e. authentification of an object, not the parties involved.

3. Discussion of the Prior Art

In accordance with the emphasis placed upon authentification of an object, as opposed to identification of a person, resulting from the above consideration of the background of the present invention in general terms it is considered that while the latter is often relied upon in attaining the former, art which is only capable of establishing personal identification, without any ability to identify an object, which ability is understood herein by the term 'authentification', is considered beyond the scope of the present discussion. It is next considered that as a practical necessity in authentification some means of marking the object must be utilized and that these means may be considered in four categories: (a) physical marking as a result of manufacture which is visible; (b) physical marking as a result of manufacture which is invisible; (c) application of visible markings; (d) application of invisible markings.

The markings, moreover, may either comprise conventional alphanumeric characters which may either utilize one or more codes or rely upon characteristics of the marking material. The present invention is concerned with and restricted to the use of codes, particularly visible, printed, codes which is a subset of category (c) application of visible markings. It is also noted that in order for codes to be useful a record or registry must be maintained and public access to that registry is necessary. Personal identification numbers (PINs) are well known secret codes which are expressly intended to never to be available to the public in visible form. Methods utilizing PINs for identification of a person only are hence excluded from the present consideration but methods utilizing a PIN as auxiliary to the use of a code printed upon an object, i.e. auxiliary to authentification, are comprehended.

REFERENCES CITED

| Patent No. | Inventor | Date | Title |
| --- | --- | --- | --- |
| U.S. Pat. No. 3,829,133 | Smagala-Romanoff | 8/13/74 | Coded Checks and Methods of Coding |
| GB 2 101 376 A | McNeight et al. | 1/12/81 | Method and apparatus for use against counterfeiting |
| U.S. Pat. No. 4,725,079 | Koza et al. | 2/16/88 | Lottery Ticket Integrity Number |
| U.S. Pat. No. 5,036,610 | Fehr | 8/6/91 | Pet Locator System And Method |
| U.S. Pat. No. 5,267,314 | Stambler | 11/30/93 | Secure Transaction System And Method Utilized Therein |
| U.S. Pat. No. 5,380,047 | Molee et al. | 1/10/95 | Authentification System |
| U.S. Pat. No. 5,778,173 | Apte | 7/7/98 | Mechanism for Enabling Secure Electronic Transactions On The Open Internet |
| U.S. Pat. No. 5,737,886 | Kruckemeyer | 4/14/98 | Method For Determining Forgeries And Authenticating Signatures |
| U.S. Pat. No. 6,030,001 | Kruckemeyer | 2/29/00 | Method For Determining Forgeries And Authenticating Signatures |

Discussion of the References Cited

Smagala-Romanoff discloses a system whereby at least one masked individual number and another clearly visible number included with the serial number are printed on cheques and the 'code' providing conversion of one to the other is memorized by the cheque bearer. This 'code' may also be printed on the cheque, preferably using at least two different characters each alternately visible or masked and related to each other with a predetermined position of each in the respective series of digits. The masking of the 'drawer's' signature is also disclosed which apparently would be of use only if the issuer and 'drawer' are the same person while the use of multiple code is suggested also to enable more than one authorized bearer or "drawer".

McNeight el al. disclose:

"a method for identifying genuinely produced or properly sold mass produced articles from fake or diverted articles that may be identical or apparently so, comprising applying to said produced articles a coded identifying mark generated by a secret algorithm, and which is unique for each article of all such articles produced or which is applicable to only a small subset of such articles, the algorithm being such that the gamut of marks is under utilised. (Page 1, lines 50–60)

Use of the code to describe the article is suggested, with a central computer directory to which queries may be made by local inspectors, i.e. police. The use of 'check digits' inconspicuously contained in the printed code in predetermined positions which are the most significant or least significant values of a number produced by treating the other numbers in the printed code with a certain algorithm is recommended.

Koza et al. disclose the use of two printed numbers, 'book' and 'integrity', on the front and back, respectively, of a lottery ticket. The book number refers to a particular packet from which the ticket originated. The book and integrity numbers of the winning tickets are related by an algorithm known only to the manufacturer and the lottery administration. The book number is further preferably covered with a foil or other lamination removable after purchase. Means for simultaneous printing of both the front and back of the tickets with computer control is further disclosed.

Fehr discloses:

A system for identifying a lost pet and locating its owner (including) a central clearing house and a pet collar or tag having a telephone number and a unique code number imprinted thereon. Information about the pet and its owner is stored at the central clearing house under the unique number and is retrievable in response to a telephone call from a finder of the pet. (Abstract)

Stambler discloses use of a 'joint code' from information associated with one or more of the parties involved in a particular transaction requiring authentification of a document or other 'thing'. The joint code is used to produce a 'variable authentification number' or VAN, associated with the transaction and the item concerned. Subsequently only:

parties capable of reconstructing the joint code will be able to uncode the VAN properly in order to re-derive the information. The joint code serves to authenticate the parties, and the comparison of the re-derived information against the information recorded on the document serves to authenticate the accuracy of that information. (Abstract)

Molee et al. disclose 'an authentification system' utilizing a unique code number which is fixed to the article "with a tamper-proof adhesive" (Abstract). A certificate is provided bearing the same unique code number. "A list of unique code numbers is maintained to enable a purchaser of the article to register that article such that the purchaser or a subsequent purchaser can verify the authenticity of the authenticated article".

Apte discloses a method for securing internet transactions which utilizes an 'isolated trusted directory server' (computer) which is accessible through a modem by a customer through a 'communication network' which is 'isolated' from the 'open' internet and which is accessible to the merchant through a 'proprietary secure protocol' protected line. A 'transaction identification number' is issued and verified through the secure protocol line and this number is verified.

Kruckemeyer discloses use of an electronic fingerprint (EF) unique to each document bearing the 'Principal's signature and containing an invariant PIN selected by a the principal. Prior to registration of the EF the principal acknowledges physical possession of the document bearing the EF with use of their PIN. A record of transfer of the document or item is further maintained by a central registry. The more recent patent broadens the EF to include bar code.

Statement of Need

While the use of codes both printed and derivable from a printed code by algorithm in verification along with use of a PIN for identification of a person as associated with a code assigned to a document or other object is known as discussed above and while registration of such codes assigned to objects is also known the capability of altering that registration is unknown and at least one principal and several ancillary problems are discerned in an application of known methods in an attempt to provide this capability. The use of a PIN, which identifies a person, as auxiliary to a code which identifies an object, is restricted by its necessarily invariant nature. Transfer of ownership is not accommodated. The PIN must remain secret and substitution of one for another must be effected by a third party to the two parties relinquishing and acquiring ownership. Information contained in the code is inherently invariant in order to provide verification and no provision is known for recognizing changes in the status of the object with regard to the type of ownership a opposed to the identity of the owner.

With practical consideration of the problems encountered in identification of an object, as opposed to parties involved in a transaction, several areas of difficulty in the application of known methods of authentification may be recognized as facilitating a useful perspective upon the scope of the need addressed. In order to deter fraudulent manufacture generally and including forgery both special, i.e. expensive, methods and materials are necessary. Secondly, special equipment for detection is required along with expertise in detection. Thirdly, the verification of authenticity inevitably requires human interpretation which is considered subject to errors in judgement. A certain vicious cycle is recognized. Since imitation is to be avoided more sophisticated means of applying codes or other identifying marks have been pursued. But the more difficult the identifier is to imitate, the more difficult it becomes to exercise the capabilities required of authentification, and the less likely these capabilities will be commonly exerted.

A long felt but unresolved need is therefore recognized for an authentification method which, without the use of any special equipment or the exercise of any particular expertise, provides for positive identification of an object based upon a code printed thereupon in accordance with a registry which enables change in type of ownership to be recognized and effectable directly between two parties in a manner verifiable by both.

SUMMARY OF THE INVENTION

Objects of the Invention

The encompassing object of the present invention is a method for authentification which enables the possessor of a physical object to read a code affixed thereto and verify authenticity by consulting a registry which further indicates a ownership status reflecting type of ownership.

A primary object of the present invention is a method for authentification which enables the possessor of a physical object to read a code affixed thereto and verify authenticity by consulting a registry and which facilitates transfer of ownership between two parties in a manner verifiable by both.

An auxiliary object of the present invention is a method for authentification which enables the possessor of a physical object to read a code affixed thereto and verify authenticity by consulting a registry and which automatically effects appropriate changes in ownership status reflecting type of ownership.

Another auxiliary object of the present invention is a method for authentification which enables the possessor of a physical object to read a code affixed thereto and verify authenticity by consulting a registry and which is capable of verifying ownership by a particular person.

An first ancillary object of the present invention is a method for authentification which enables the possessor of a physical object to read a code affixed thereto and verify authenticity by consulting a registry accessible on the World Wide Web (WWW).

A second ancillary object of the present invention is a method for authentification which enables the possessor of a physical object to read a code affixed thereto and verify authenticity by consulting a registry and which further enables a party recognized as the owner to effect an automatic change in ownership status in association with selling the object concerned.

A third ancillary object of the present invention is a method for authentification which enables the possessor of a physical object to read a code affixed thereto and verify authenticity by consulting a registry and which further enables an individual to register as the owner of the object.

A fourth ancillary object of the present invention is a method for authentification which enables the possessor of a physical object to read a code affixed thereto and verify authenticity by consulting a registry and which further enables a registered individual owner to provide proof of ownership through disclosure of a secret code selected by the owner.

A fifth ancillary object of the present invention is a method for authentification which enables the possessor of a physical object to read a code affixed thereto and verify authenticity by consulting a registry which is applicable to paper currency.

A sixth ancillary object of the present invention is a method for authentification which enables the possessor of a physical object to read a code affixed thereto and verify authenticity by consulting a registry which is applicable to financial notes.

A seventh ancillary object of the present invention is a method for authentification which enables the possessor of a physical object to read a code affixed thereto and verify authenticity by consulting a registry which is applicable to mass produced manufactured goods.

An eighth ancillary object of the present invention is a method for authentification which enables the possessor of a physical object to read a code affixed thereto and verify authenticity by consulting a registry which is applicable to works of art.

Principles Relating to the Present Invention

In obtainment of the objectives given above it is suggested that a trinary code possessing three components be utilized wherein the first is related to origin, the second to authentification, and the third to ownership. It is suggested that the origin code possess invariant assignation to the creator and that the authentification code possess an assignation in accordance with an algorithmic rendering related to the origin code. And it is suggested that the ownership code possess a status reflective of the type of ownership which is variable in accordance with recognized changes thereof. It is further suggested that the origin code and preferably the authentification code also be affixed to the object preferably by printing directly upon the article concerned and that the same be held in a registry accessible via the world wide web (WWW). This enables anyone in possession of an article so coded to verify authenticity by entering both the origin and authentification codes. A two phased encoding is also facilitated whereby the creator may apply either the origin code alone and a second party taking authorized possession may enter the authentification code. The creator may, alternatively, assign both the origin and authentification codes.

Recognition of ownership and authorized changes in ownership in stages is facilitated. In addition to the implicit change in ownership possible from the authorized assignment of the authentification code by a party other than the creator the ownership code component reflects at least one of two states and accommodates changing from one state to another. The ownership code is variable and is not printed on any article. Ownership status reflecting the type of ownership is available in response to query of a registry containing the origin and authentification code and hence is normally available to anyone in possession of the article concerned. The ownership status may be simply 'home' or 'field' indicating possession by authorized entities or otherwise. This status may be trinary between 'creator's inventory', 'authorized purveyor's inventory', and 'sold' and may be expanded to include as many types of authorized entities as considered desirable.

It is considered desirable to enable recognition of ownership by a private party as well as one or more types of authorized entities. With a binary ownership status, wherein 'home' and 'field' categories alone are recognized, it may further be preferred that this constitute the full extent of recognition of ownership by a private party which in this case corresponds to the public at large which is opposed to authorized entities. A relatively simple trinary ownership status might also simply recognize the article as being in the public without the capability of a private owner registering the article. Ownership status may also reflect registered ownership by a private entity with the use of a secret ownership code subcomponent selected by the private entity. The ownership status is still available to any party entering the origin and authentification codes and it reflects not only ownership by a private party, e.g. sold by an authorized purveyor, but indicates that the article concerned has been registered by the private owner with a secret ownership code subcomponent.

Registered transfer of ownership at all levels is encompassed in a manner appropriate to every category of physical object. In categories in which registered private ownership is desirable a transfer of that registered ownership is effected by changing the secret ownership code subcomponent which is disclosed to a purchaser who may then access that secret ownership code subcomponent in verification of ownership and also substitute another secret ownership code subcomponent unknown to the seller. Ownership status, available to anyone in possession of the printed origin and authentification code, may indicate that the article concerned has been registered a second, or third, et cetera, time. It is understood that computer technology is involved in both the generation of algorithmically derived authentification codes, registry of all codes and code subcomponents and that posting of the registry on the WWW is the preferred manner of access to the registry.

In addition to the secret ownership code subcomponent it is recommended that the origin and authentification codes possess subcomponents. It is specifically suggested that the origin code contain a subcomponent which is invariant to the creator and a subcomponent which reflects information including time and location of origin. The authentification code may be derived algorithmically from the origin code and it is recommended that at least a portion of the authentification code be the direct result of an algorithm applied to a certain portion of the origin code. The algorithm utilized however, may be determined by a separate authorized access registry related to the origin code. And the authentification code may contain two or more subcomponents which each may be algorithmically derived from a subcomponent of the origin code.

DETAILED DESCRIPTION OF THE PREFERRED EMBODIMENT

The four categories suggested for consideration of fraudulent activity: (a) paper currency; (b) cheques and other financial notes; (c) manufactured goods; (d) works of art; are first reconsidered in view of a more fundamental damage than intimated previously. To wit, it is considered that fundamental issues regarding the recognition, and enforcement in defense, of intellectual property are involved which are readily appreciated with consideration of the fine line between suggested categories (c) & (d) above observed in certain industries which are perhaps most sensitive to infringement. The motion picture, video cassette recording (VCR), compact disc (CD), digital video disc (DVD), computer software, clothing and other fashion consumer goods industries are all considered to be characterized by a concern for intellectual property protection which is more sensitive than that for traditional manufacturers of goods which are readily protectable by full, utility, and design patents.

These more modern industries rely heavily upon protection of artistic content which is only protectable by copyright and in areas where patent protection is available, such as computer software, the protection comprises a relatively recent improvement over the copyright protection previously relied upon. It is further considered that relevant legal process has generally lagged technological development in the last twenty years as evidenced by the U.S. Supreme Court taking ten years to decide the VCR case involving Sony™ by which time the ruling necessarily accommodated the widespread but essentially illegal taping of copyrighted material for personal use. It was only twenty years ago that computer hardware became patentable subject matter and only in the last ten that software has been similarly recognized. The development of technology, moreover, is seen as generally facilitative of fraudulent activity for these more modern industries and hence the importance of addressing this broader underlying concern considered paramount.

Digital commodities may have a printed code affixed thereto in a conventional manner upon the packaging or by digital coding of the material itself A CD, for example, is a physical product possessing a relatively smooth hard exterior surface which is perfectly suited for printing upon with ink a code in conventional alpha-numeric characters which is readily visible to anyone in possession of the CD. The physical product, moreover, may be protected by patent and fraudulent manufacture and sales prohibited thereby. The content of the CD, however, which is recognized as having value independent of the physical object, is protectable only by copyright and therefore unless profits are derived from copying for distribution, as current copyright law as understood by the present author requires, no damages for infringement can be readily sought. The content of the CD may be downloaded to a personal computer (PC) and transferred via the World Wide Web (WWW) to a friend's computer for their enjoyment and that friend may encode their own CD with that copyrighted content using a widely available accessory to their PC.

The question of legal ownership of content is hence recognized as a difficult one which is not wholly unrelated to the existence of a physical object taken independently of the digital content held thereby. The only purpose of the CD is to hold digital content in a manner which is freely transferable. The legal possessor of the content is primarily the copyright holder with licensing through sales to the public. But unless a profit is derived the licensing is essentially extended to accommodate any usage desired by a licensee.

The problem seems rooted in the nature of copyright which is implicit to artistic creation but which requires submission of a physical representation for registration. The original work existed in a particular physical form and prohibiting reproduction in that form of the content is perhaps the primary intent behind recognizing copy rights. In the case of a CD the original work comprising the content is likely to have been magnetic ink on tape. The tape can have a code printed thereupon in conventional, visible, printed alpha-numeric characters. A voice over could read these characters onto a header for the audio content, much in the manner of the visual warning regarding copyright found at the beginning of a VCR, and the same approach is considered applicable to the content of the CD, but it is doubted that the market would tolerate such an intrusion. It is therefore recognized that certain practical circumstances apply to enforcement of certain intellectual property rights.

With regard to the present invention it is stressed that fulfillment of the principles relating thereto is considered to be comprehensive of all owner's rights to property and that authentification of a work of art is expressly included regardless of physical form. The printed binary origin and authentification code of the present invention has been restricted to use of visible conventional alpha-numeric characters affixed to the article concerned so that the possessor of the same may readily read the same and verify authenticity over the WWW with a query conveying a valid code. If the object is essentially digital it is still considered practical to present conventional, alpha-numeric, code visible to the possessor of the object for the essential purpose of verifying authentification of the object. Even if the manner of presentation is not strictly printed in conventional manner with publisher's ink the code is visibly printed for the possessor of the object with regard to satisfaction of the principles relating to the present invention.

The question, moreover, of what is considered a suitable object in utilization of a fulfillment of the principles relating to the present invention is considered cardinal to a detailed description of the preferred embodiment of those principles because it is considered that one of the cardinal features of the present invention is the versatility obtained by proper exercise of said principles in adopting features of said invention in a manner appropriate to the type of object addressed. The preferred embodiment of said principles has a universal code subcomponent to the origin code related to information which categorizes the object in a universal manner and which is hence necessarily comprehensive of all types of objects to be encompassed and preferably is associated with a directory listing of all categories with each associated code which is publicly available via the WWW.

The attempts to categorize types of objects to be encompassed by an authentification method in accordance with the principles relating to the present invention are, moreover, considered to be merely demonstrative of said principles in setting forth what is considered to be the best known manner of embodying the same. It is believed that the categories chosen for this exemplary exercise provide useful indicators of rules regarding the preferred fulfillment of the principles relating to the present invention. These rules are obtained with contrast of the characteristics of the different categories chosen for exemplary reasons and are hence not so much dependent upon any specifics regarding any category but with recognition of such differences which recognition is the basis for determining an appropriate structure for the necessarily variable ownership status with regard to different types of objects.

The first category considered, (a) paper currency, is considered actually to possess a relatively more complex distribution system than for the other categories because paper currency is issued by a government and is recycled whereby the direction of anticipated ownership is reversed from government down to public to public up to government. This is done in the United States through the Federal Reserve Board, Federal Reserve Banks & Regional Offices (FRB) as well as through cooperating deposit taking institutions (DTIs) inclusive of regulated bands which are 'charged back' by the Federal Reserve Board for counterfeit currency if detected in return of the same during recycling. The DTI may similarly 'charge back' the depositor, if traceable, along with appropriate fees. DTIs are charged back more than depositors and of those nearly all are businesses as opposed to private individuals. The fact that current statute requires "passing counterfeit currency knowingly" for fines of up to $5,000, or imprisonment up to fifteen years, to be applied is considered the most salient known condition determining this situation and the appropriate application of the principles relating to the present invention with regard to this category.

Paper currency is considered, moreover, to comprise an extreme condition for a preferred embodiment in accordance with the principles relating to the present invention wherein certain restrictions are imposed by the characteristics distinguishing this category from the others. Because paper currency is recycled, both with regard to anticipated direction of ownership and literally with periodic 'retiring' of old bills and issuance of new, use of only two conditions of ownership status may be considered appropriate, namely, 'home' and 'field', wherein 'home' indicates possession by the government which in the U.S.A. includes the U.S. Dept. of Treasury & Bureau of Engraving and Printing as putative 'creator', and the FRB, with 'field' being comprised of the DTIs and the public with an estimated sixty per cent of the currency being actually outside the United States.

In contrast to (a) paper currency and (b) financial notes, which are also intended to be recycled with regard to issuer and buyer if not physically replaced, (c) manufactured goods and (d) works of art typically follow an anticipated one directional ownership transfer from creator to private individual which is further typically through recognized purveyors inclusive of distributors and retailers. It is considered that such non-financial goods rarely are found traveling the other direction. Defective product may be taken back to the retailer or distributor or manufacturer and it is suggested that the ownership status of a non-financial object also be reversible but that the anticipated direction of ownership be used as the basis of a rule whereby ownership status undergoes declension reflecting sales in a recognized chain beginning with creator and terminating with the public. If the creator is a mass production manufacturer of goods which normally goes through at least one distributor and then to a number of retailers thence to the public the ownership status structure considered appropriate would be: manufacturer to distributor to retailer to public; wherein three declensions of ownership status are effected automatically with registered sales from one type of owner to the succeeding type of owner.

As in the contrast of financial notes with paper currency a more subtle distinction between works of art and mass produced manufactured goods is observed wherein artists might commonly sell through a single dealer directly to the public in which case only three conditions of ownership status, and two declensions, are appropriate. More than four conditions of ownership status are also readily considered appropriate but it is also considered desirable to minimize the number of conditions of ownership status necessary to encompass all forms of ownership for reasons of simplicity. The ownership status is not a tracking code though it exhibits similar characteristics.

The ownership status is, fundamentally, an indicator of the type of ownership. In the extreme case only two ownership status conditions, 'home' and 'field' may be considered appropriate, especially for paper currency as discussed above. For cheques, particularly, if not other financial notes, use of a similar binary ownership status is considered appropriate while for other financial notes including bonds and stock certificates a third status condition for institutional underwriter between entity issuing and entity purchasing is considered appropriate. Financial notes are also generally contrasted to paper currency in being 'titled' which provides traceable transfer of ownership. The current title may be reflected by the ownership status and related to the binary origin and authentification code.

The ownership status alone, regardless of the number of recognized conditions indicating type of current ownership, cannot enable personal registration of the object by any owner or purchaser. The third major code component, the ownership code, is inclusive of both the ownership status and a secret ownership code subcomponent which utilization is considered undesirable in the case of existing paper currency, especially U.S. 'greenbacks' of current denominations and value, but which utilization is considered desirable for future paper currency, especially for considerably larger denominations then current in the U.S.A. of a value commensurate with the larger denominations available in previous U.S. history. A one thousand dollar bill from 1930 conveyed a value well over ten thousand dollars in current terms and while it seems impractical to permit private registration of one hundred dollar bills the same practice seems eminently feasible for and ten and twenty thousand dollar bills given current values for these denominations.

The ownership code is, with regard to the principles relating to the present invention, necessary to the extent that a variable ownership status is provided. Preferably the ownership code is further possessed of a secret code subcomponent that is available only to a private purchaser or the last anticipated form of ownership status. Changes in ownership status are properly an automatic consequence of a change in type of ownership. When an object is purchased from a retailer which is of a value considered sufficient to permit profitable provision of ownership registration it is considered appropriate to provide the option of the secret ownership code subcomponent. This option and all other expenses of the system may be borne by subscription which is considered the basis for a profitable system. Whether the private owner and each subsequent owner pays a subscription directly or whether the subscription is included in a prior type of ownership is hence considered a matter of choice between design elements. If a government desires control of the system the tax payers of the relevant political entity might be the subscribers.

It is emphasized that the ownership code necessarily is variable and necessarily indicates ownership status which is related to the type of ownership as described above. The secret ownership code subcomponent is optional but included in a preferred embodiment of the principles relating to the present invention. The use of a trinary code inclusive of an origin code, an authentification code, and a ownership code is necessary and printing of the binary origin and authentication code upon the object is necessary. The origin code relates to information concerning the origin and preferably contains a universal code subcomponent which identifies a category for the creator or object. It is preferred that the origin code further be related to information concerning the identity of the creator and the time of creation.

The authentification code must contain a portion which is algorithmically derived from a portion of the origin code. The algorithmic derivation is held in memory of a computer utilized for verification of a valid authentification code based upon the origin code which facilitates authentification of an object bearing this binary code with a proper query containing this binary code made of the registry. This query is preferably conductable via the WWW but may be otherwise handled at greater expense by other means including human personnel answering a telephone and consulting the registry with input of the binary code and determination of whether the authentification code is valid in being derivable from an algorithm recognized as properly assigned to that origin code in the generation of authorized authentification codes. The registry consulted, however, is necessarily held in computer memory as it must encompass all authorized algorithms for all the origin codes encompassed by that particular server and have an internal registry between these two banks of memory, for authorized algorithms and for origin codes, as well as the capability of running every algorithm authorized for each origin code encompassed for determining whether the authentification code concerned could have been generated by an authorized algorithm assigned to that origin code.

In a preferred embodiment of the principles relating to the present invention the internal algorithm registry relating authorized algorithms to recognized origin codes utilizes a portion of the latter as a reference for the former. This portion may consist of the entire origin code but preferably comprises a subcomponent which is wholly separate from the universal code subcomponent and which may be independent of, though preferably related to, a creator identification subcomponent code. Time of creation is an indicia which may comprise this subcomponent to the origin code which is further suggested as an appropriate basis, preferably in combination with information identifying the creator if not an identification subcomponent code, for algorithmic derivation of authentification codes authorized for that creator.

Use of an origin time subcomponent code as a basis for determining the applicable algorithm enables use of one invariant unique code pertaining to the creator in conjunction with another necessarily variant and serial code which together are readily used for generation and verification of a practically unlimited number of valid algorithmic authentification codes. Which algorithm(s) are authorized may further be determined, if desired, by recognition of thresholds in the serial advance of the origin time subcomponent code. In other words, use of multiple algorithms is facilitated in addition to ensuring that a single algorithm assigned to a given creator will generate unique authentification codes simply by utilizing an increment for the serial progression of the origin time subcomponent code lesser than the time required to produce an object whereby every object is guaranteed a unique binary code which is readily authenticated.

In further detailed discussion of a preferred embodiment of the principles relating to the present invention two opposed examples are utilized, one for a mass produced consumer product, and another for paper currency. As an arbitrary choice of a specific product a book is selected. The creator of the object in this case is a publisher, though the author is the content creator, and the anticipated chain of ownership is from publisher to distributor to retailer to a private individual, i.e. three declensions, though the distributor may sell directly to private individuals, i.e. two declensions. An appropriate ownership status hence reflects ownership by four different types: publisher, distributor, retailer, and public. Whether a secret ownership code subcomponent is desired or not may depend upon the value of the book but in either case the publisher, distributor, retailer, and public are all beneficiaries in that authentification of the book as the genuine article is ensured and fraudulent practices are deterred. Each owner has a means of verifying authenticity if desired and further has automatic proof of ownership with regard to type of entity.

The ownership status is automatically changed with a sale by an entity recognized as being of the correct ownership status and authorized to change that status as an indication of sale to an entity of the next anticipated status condition. This is known herein as declension of the ownership status. It is not necessary that any particular entity, including the creator, be identified though this attribute may be considered desirable. Most saliently perhaps with practical regard to common fraudulent practice concerning books, which principle is considered applicable to mass produced objects generally, anyone considering purchase of a book containing the binary origin and authentification code components which, in a proper query of the registry, reveals the current ownership status cannot be readily fooled into believing that the book is 'new' or uncirculated because the ownership status is changed only in consequence of recognized transfers of ownership exclusive of any secret ownership code subcomponent.

In this manner the simple difference between 'home' and 'field' considered appropriately applicable to paper currency and cheques is further observed in all other categories and defines a consistent rule for an embodiment in accordance with the principles relating to the present invention: only authorized entities may be connoted by a ownership status other than public and declensions, as defined above, are automatically made in consequence of a recognized transfer of ownership from an entity of the current ownership status to an entity of the succeeding ownership status condition anticipated in the chain of ownership recognized by the ownership status condition structure utilized. In the example of a book these declensions might be from publisher to distributor, or distributor to retailer, or retailer to public. The reverse change of status, up the chain of anticipated ownership rather than down the same, is preferably proscribed as requiring further authorization from another party which is preferably the party which is taking back the inventory. In this manner returns are accommodated and obviously manifold fraudulent practices otherwise permissible are effectively eliminated.

A similar safeguard is included in the required operation of the secret ownership code subcomponent which is preferably available only in consequence of an ownership status change to public or 'field'. Input of the full trinary code including the secret ownership code subcomponent is necessary to access and to modification inclusive of replacement of each secret subcomponent. The first public purchaser of an object bearing the binary origin and authentification code may verify authenticity with the same, may also verify that the ownership status is correct, and preferably may enter a secret ownership code subcomponent of their own selection. It is noted, moreover, that this is expressly not a personal identification number (PIN) which is invariant and identifies a person. The difference is readily appreciated in consideration of the operation.

If a PIN were utilized for the secret ownership code subcomponent all the objects so registered would be vulnerable to theft and the means by which registered transfer of ownership to another member of the public is facilitated would be wholly useless as disclosure of the secret ownership code subcomponent is relied upon to verify registered ownership to a new purchaser who can then replace that secret ownership code subcomponent with one of their selection. This suggests that each member of the public interested in registration of a plurality of objects maintain a personal registry for the same which is further considered useful in substantiating insurance claims.

In a preferred embodiment of the principles relating to the present invention with regard to the transfer of ownership of a book, as a specific example, and more generally to mass produced goods as a category, the change in the ownership status reflecting a transfer of type of ownership is preferably a consequence of scanning the binary code printed upon the object. For this reason the binary origin and authentification code is preferably replicated in both human readable, visible, alpha-numeric characters and a machine readable rendering (MRR) including Magnetic Ink Character Recognition (MICR) which is expressly preferred because of long use by the banking industry. Two dimensional bar codes and programs for bulk transfer comprise two other examples of MRR considered appropriate. Regardless of the specific technology utilized to enable machine reading it is preferred that scanning of the binary origin and authentification code as a part of selling the object concerned by an authorized party of the correct ownership status will automatically result in declension, i.e. a change in that status to the next anticipated status as an indication of sale.

Public is distinguished from all other conditions of ownership status in a manner consistent with the rules regarding change of ownership status, including the option of a secret ownership code subcomponent, and with the rules regarding access to registry files. Access to files enabling change of ownership status are unavailable to the public. Public access to all information necessary to authenticate a binary origin and authentification code is necessary and public access further preferably includes information in the format of directories for a universal code and creator identity. These directories might further be explicative of a creation time origin code subcomponent though this might be largely transparent anyway. The algorithms authorized are not to be publicly known in any manner nor accessible to any party save the creator or a creator authorized party.

It is also preferred that entrance of a given origin code will optionally route Internet based access from a server computer receiving the query to another maintaining information pertaining to that origin, preferably a 'web site' maintained by the creator. This option in public access enables any owner of a typical major appliance to read the origin code from the appliance and access information about troubleshooting problems, for example, which might be similar to the printed owner's manual which is typically provided with the product but which is readily updated and facilitative of a more extensive format. The ordering of spare or replacement parts is readily facilitated as is the ordering of new units, disposable parts, refills, et cetera. It is believed that this convenience will be appreciated by both consumers and manufacturers as a very effective marketing vehicle.

Preliminary to consideration of the second example, paper currency, it is noted that for both this category and mass produced manufactured goods, but not particularly for financial notes and not for all works of art, the ability to scan the binary origin and authentification code at a retail point of sale is considered highly desirable. In facilitation of this ability it has been suggested that MICR or bar code or other MRR of the binary origin and authentification code duplicative to a rendering of the code in human readable form be utilized.

A preferred scanning means further possesses WWW based authentification and counterfeit detection capabilities and another input ability to a proprietary register for tracking sales which can be downloaded automatically or periodically to a server computer either maintaining or possessing authorized access to the ownership status of the product encompassed. A device possessing a MRR, preferably MICR or bar code, reader, a CPU, memory, graphic display, preferably liquid crystal diode (LCD) or light emitting diode (LED), communication board, RS 232 port, and twelve button key pad connectable to the Internet preferably with a direct subscriber line (DSL) is specifically suggested for this purpose whereby scanning of the MRR with an operable device enables recording of the binary origin and authentification code in memory, communication of the same in the form of an authentification query to the registry via the WWW if a charge back or verification of currency is involved, and communication of a request to change the ownership status in registry via the WWW for any good being sold, along with display the result of this request. A receipt printing attachment is also suggested for printing this result.

For purposes of detecting counterfeit currency it is suggested that regulated use of a system employing a scanner as described above be made wherein banks, recognized businesses, and other appropriate entities be considered as a third ownership status condition, 'base', which is in addition to the 'home' and 'field' ownership status conditions recognized as a minimum necessity. This is in recognition of the observation that most 'passing' of counterfeit money is from the public or 'field' in this trinary ownership status structure to businesses comprising the 'base'. As previously noted DTIs are charged back by the FRB for counterfeit currency more frequently than DTIs charge back businesses and far more frequently than DTIs charge back private depositors. It is considered desirable to detect the passing of counterfeit currency earlier, before detection by the FRB after deposit from DTIs, which was after deposit by businesses who first were passed the counterfeit from the public.

Since it is most likely that counterfeit paper currency would be comprised of a plurality of identical notes each bearing an imitation of a genuine binary origin and authentification code of a genuine note it is considered advantageous to detect multiple notes of the same binary code. With the 'base' ownership status condition this detection is facilitated with a current register which maintains a record of all binary codes for currency recognized by scanning performed by businesses comprising the'base'. The DTIs, moreover, are preferably included in the 'base' for purposes of a current register which is constantly updated. Paper currency in possession of the FRB and possessing a 'home' ownership status need not be concerned because this currency is not in circulation.

This is aside from the automatic recognition of an authentification code which could not be algorithmically derived in accordance with the origin code which will appear on the display screen of the scanning device suggested above. An invalid authentification code means the paper currency is counterfeit. Detection of a valid authentification code being passed from 'field' to 'base' which is a duplicate of another which indicates 'base' ownership status means that one of the notes is counterfeit and that others may be expected. Notification of FRB is indicated and the passage of bills bearing the duplicate valid authentification code becomes information considered of use to any resulting investigation by the Secret Service which is the pertinent investigative body in the U.S. The provision of this information is hence considered of obvious utility.

It is considered that the 'base' may be merged with the 'home' with regard to a current register and that the distinction between home and field is essentially shifted to include banks and recognized businesses as part of 'home' rather than 'field'. The 'home' ownership status, however, is still considered useful in distinction with the 'base' ownership status because each entity would likely prefer to have separate computer systems with the 'base' network being informative of the FRB network but without authorized access which the FRB would preferably have with regard to the 'base' network. Another preferred option is to distinguish DTIs from other base members with regard to authorized access which may operate in conjunction with a fourth ownership status, 'bank', in addition to 'home', 'base', and 'field'.

Or the DTIs could be essentially transferred from 'base' to 'home' but this arrangement, although considered attractive in presenting a trinary ownership status and in grouping authorized access entities together, must still possess an internal distinction with regard to the FRB and the DTIs which would necessarily include increased access authority for the FRB. And the businesses possessing base ownership status still have limited access authority not possessed by the public. Therefore it is recognized that the ownership status is necessarily related to the pertinent access authority which is hence determined, in a preferred embodiment of the principles relating to the present invention, by the ownership status condition. Several considerations are noted: the ownership status is related to access and authority in a preferably hierarchial structure from creator down to public; authority is limited to: downward revision of the ownership status condition as an indication of a recognized transfer of ownership; or to acceptance of an implicit offer of upward revision of ownership status by the owner as a condition of tender.

In the example for paper currency a member of the public receives from a DTI a ten thousand dollar U.S. Treasury Note, hereinafter known as a ten thousand dollar bill, possessing a binary origin and authentification code which enable authentification, verification of ownership status, and utilizing a preferred embodiment of the principles relating to the present invention, also permits use of a secret ownership code subcomponent. The binary origin and authentification code is scanned in the withdrawal and the ownership status condition automatically changed from 'bank' to 'public' with a receipt in record of this action preferably bearing the printed binary origin and authentification codes of all the bills concerned in the withdrawal. The ten thousand dollar bill is authenticable by the receiving member of the public via the WWW and is further now automatically open to entrance of a secret ownership code subcomponent.

The owner may elect to enter this or not. Once entered access to and the authority to alter or replace the secret ownership code subcomponent is limited to entrance of the full trinary origin, authentification, and ownership code including this secret subcomponent. And the ownership status preferably further changes from 'field' to 'private' which are both public with regard to other authorized access but which indicates that the object has been registered by a member of the public. It is considered necessary to indicate a change in ownership status with the first entrance of a secret ownership subcomponent so that a prospective recipient may ascertain if the object has been registered and hence requires the secret ownership code subcomponent in addition to the binary origin and authentification code components prior to acceptance as payment. Transfer of registered ownership is automatically effected with replacement of the secret ownership code subcomponent which action is enabled by disclosure of the same to the prospective owner who, in verifying registered ownership, may effect the transfer.

The ten thousand dollar bill withdrawn from a bank is used by the proper owner to purchase goods from a business. If entrance of a secret ownership code subcomponent has been made scanning of the ten thousand dollar bill indicates this condition in the ownership status. Provision of the correct secret ownership code subcomponent as the condition for acceptance of the bill must be required by the business in order for the business to clear the ownership code subcomponent which is necessary for access to and authority to change the ownership status condition from 'private' to 'base'.

If the secret ownership code subcomponent has not been entered the business has no bar to either access or authority to change the ownership code from 'field' to 'base'. The ten thousand dollar bill may be authenticated by the business and may additionally be checked against a current register of authenticated binary codes currently possessing 'base' status, if not 'bank' and 'home' status, by request which enables no access to the current register but simply indicates whether or not the binary origin and authentification code is duplicative of one in that database. The current register database, moreover, needn't necessarily be comprehensive of all businesses authorized to change ownership status as an indication of sales which comprise the 'base' in this case. The comprehensive current register for the entire 'base' preferably comprises a cooperative network of various server computers each maintained by a single business or group of businesses. Even if the entire comprehensive current register where to be maintained by the same entity it would necessarily be comprised of various server computers working in cooperation with each other.

It is hence considered, in an appropriate organization of databases comprising a current register in a preferred embodiment of the principles relating to the present invention, to recognize different levels of networks each corresponding to a ownership status condition and authority pertaining to that network with regard to changes in ownership status condition. Within each network it is recommended that individual server computers and groups of server computers each recognized as being maintained by a single entity cooperate in exchange of information to comprise a component current registry for that ownership status condition and that this information from each component current registries further preferably be made available to the others in response to queries specifying particular binary origin and authentification codes. The largest current register including 'home', 'bank', and 'base' is still basically known as opposed to the 'field' inclusive of 'private' ownership status.

The ten thousand dollar bill, after being accepted as payment for goods by a business has a ownership status condition of 'base' and the secret ownership code subcomponent is cleared regardless of prior condition. The ten thousand dollar bill is now deposited by the business with a bank and the binary origin and authentification code is verified as authentic and non-duplicative. The ownership status condition is changed from 'base' to 'bank' and the business preferably receives a receipt bearing evidence of this action. The ten thousand dollar bill is similarly recycled upward to the FRB and downward from the same with periodic recreations when desired. With regard to the full ownership status, the condition has changed from field, with a subcondition of either public or private depending upon whether the single private withdrawer in this example has exercised the option of entering the secret ownership code subcomponent, to 'base' generally and 'bank' and 'home' more particularly, with the acceptance as payment by the registered business, DTI, and the FRB, respectively.

This completes a full cycle from FRB to DTI to public back up through a registered business to a DTI and to the FRB. The cycle is comprised of two directions of movement each characterized by a corresponding change in the ownership status condition, downward from FRB to public, and upward from public to FRB. Each transaction in the downward direction of movement results in declension of the ownership status condition generally from 'home' to 'field' and particularly from 'home' to 'bank', optionally to 'base', and to 'field'. The last declension, to 'field', may or may not further provide the option of entering a secret ownership code subcomponent and if so 'field' is comprised of 'private' and 'public' depending on whether the option has, respectively, been exercised or not.

Regardless of whether the option of the secret ownership code subcomponent is provided or not, and regardless also of whether the object concerned in an authentification method in accordance with the principles relating to the present invention is paper currency or a manufactured good or a work of art or any other object, the ownership condition indicated by the ownership status is considered to change in one of two directions from creator to a member of the public usually through intermediaries which can be readily recognized and authorized for effecting automatic, i.e. unilateral, declension of ownership status while transfer of ownership in the reverse direction, from public to creator, usually through intermediaries, requires the implicit offer of change in status accepted in verification of authenticity.

It is emphasized that the public, which lacks the recognized authority to alter the ownership code status, is still protected by the ability to authenticate an object, preferably via the WWW, and may further preferably demand a printed receipt bearing a trinary code inclusive of the origin, authentification, and the ownership code components with the last clearly indicating the declension effected by the sale or withdrawal or other form of receivership in transfer of the ownership of the object. The public is further preferably protected with the secret ownership code subcomponent which cannot be changed by any authorized entity except by clearing that memory in reverse declension from public to base or other ownership status condition authorized to alter the ownership status which authorization is restricted to changing the condition to that held by that entity.

The foregoing is intended to provide one practiced in the art to which the present subject matter most closely pertains with what is considered the best manner of fulfilling a preferred embodiment of the principles relating to the present invention and is in not to be construed in any manner as restrictive of said invention nor of the rights and privileges obtained by granting of letters patent for which I claim:

What is claimed is:

1. An object authentification method comprising the following steps:
   (a) printing upon each of a plurality of objects each possessing a recognized creator an origin code component which is unique to said recognized creator of said plurality of objects;
   (b) printing upon each of said plurality of objects an authentification code component derived algorithmically from a base related to said origin code component each of which is unique with respect to every other said authentification code derived from said base related to said origin code component;
   (c) recording said origin code component in a computer memory registry together with related information pertaining to the recognized creator including the identity of the same;
   (d) recording in said registry each said authentification code component printed upon each of said plurality of objects for, and in a manner related to, said origin code component;
   (e) recording in said registry, in a manner related to each said authentification code component, an ownership code component including an ownership status which has at least two conditions each indicative of a type of ownership including that by the recognized creator of said plurality of objects initially and which condition is variable by authorized access to said registry to reflect transfer of ownership inclusive of declension of said ownership status to a condition indicating the type of ownership anticipated in a recognized chain of ownership types from creator to public as an indication of sale of an object bearing said origin and authentification code components by an entity recognized as being of the type of ownership indicated by the ownership status for said object;
   whereby each said authentication code component may be verified as being a valid, algorithmically derived, authentification code component printed upon one of said plurality of objects possessing a single recognized creator, and the ownership status indicating the type of ownership recognized for each said authentification code component may be ascertained, both with reference to said origin and authentification code components in said registry.

2. The authentification method of claim 1 wherein said registry is accessible with regard to verification of a given origin code component and authentification code component pair to the public via the world wide web (WWW).

3. The authentification method of claim 1 wherein said registry is accessible with regard to the ownership status of a given origin code component and authentification code component pair to the public via the world wide web (WWW).

4. The authentification method of claim 1 wherein said origin code printed upon said plurality of objects by said recognized creator is inclusive of a creation time subcomponent code corresponding to the time of creation.

5. The authentification method of claim 4 wherein said base related to said origin code component is comprised of said creation time subcomponent code.

6. The authentification method of claim 1 wherein steps (a) and (b) are performed utilizing alphanumeric characters.

7. The authentification method of claim 6 wherein steps (a) and (b) result in alphanumeric characters which are visible to the human eye.

8. The authentification method of claim 1 wherein steps (a) and (b) are conducted with Machine Readable Rendering (MRR) and result in printed origin and authentification code components which are machine readable.

9. The authentification method of claim 8 wherein said printed origin and authentification code components are comprised of bar code.

10. The authentification method of claim 8 wherein said printed origin and authentification code components are comprised of magnetic ink suited for Magnetic Ink Character Recognition (MICR).

11. The authentification method of claim 1 further including the step of printing a receipt of sales bearing the origin and authentification code components.

12. The authentification method of claim 11 wherein said receipt of sales further bears an indication of said declension of ownership status.

13. The authentification method of claim 1 wherein at least three different types of ownership status are utilized including creator and public and at least two declensions of ownership status are provided.

14. The authentification method of claim 13 wherein at least four different types of ownership status are utilized including creator and public and at least three declensions of ownership status are provided.

15. The authentification method of claim 1 further including the step of recording into said registry a secret ownership code subcomponent available only after declension of ownership status to public.

16. The authentification method of claim 15 wherein said secret ownership code subcomponent is initially entered with reference to the origin and authentification code components in said registry and after entry is accessible only with the origin and authentification code components and the secret ownership code subcomponent.

17. The authentification method of claim 16 wherein entrance of said secret ownership code subcomponent with reference to said origin and authentification code components is made over the WWW.

18. The authentification method of claim 16 wherein said secret ownership code subcomponent is initially entered with the origin and authentification code components and after entry is alterable only with the origin and authentification code components and the secret ownership code subcomponent.

19. The authentification method of claim 16 wherein a private ownership status indicating private registration of the object by a member of the public accorded as the result of initial entrance of said seceret ownership code subcomponent.

20. The authentification method of claim 19 wherein a reverse declension from private ownership status to another status is effectable with the origin and authentification code components and the secret ownership code subcomponent.

21. The authentification method of claim 19 wherein said reverse declension from private ownership status further results in clearing of said secret ownership code subcomponent.

22. The authentification method of claim 1 wherein said plurality of objects upon which a printed origin and authentification code components are printed by a single recognized creator is comprised of paper currency.

23. The authentification method of claim 22 wherein both human and machine readable origin and authentification code components are printed upon said paper currency.

24. The authentification method of claim 23 wherein said machine readable origin and authentification code components are printed utilizing Magnetic Ink Character Recognition (MICR).

25. The authentification method of claim 22 wherein one said status condition is 'home' indicating ownership by an authorized entity including any government entity involved in the printing and distribution of said paper currency.

26. The authentification method of claim 25 wherein said 'home' status condition indicates ownership by an authorized entity including any government entity involved in the printing and distribution of said paper currency and including recognized Deposit Taking Institutions.

27. The authentification method of claim 26 wherein said one said status condition is 'public' indicating ownership by any entity exclusive of any government entity involved in the printing and distribution of said paper currency.

28. The authentification method of claim 27 wherein said 'public' status condition indicates ownership by an authorized entity exclusive of any government entity involved in the printing and distribution of said paper currency and recognized Deposit Taking Institutions.

29. The authentification method of claim 28 wherein said one said status condition is 'bank' indicating ownership by a recognized Deposit Taking Institution.

30. The authentification method of claim 27 wherein said 'public' status condition is exclusive of indicating ownership by a recognized business.

31. The authentification method of claim 30 wherein one said status condition is 'base' which is inclusive of indicating ownership by a recognized business.

32. The authentification method of claim 30 wherein at least one said creator maintains a web site accessible from said registry.

33. The authentification method of claim 32 wherein at least one said web site is accessible from input of an origin code component.

34. The authentification method of claim 32 wherein at least one said web site is accessible from input of a creator code subcomponent.

35. The authentification method of claim 32 wherein at least one said web site is accessible from a directory of recognized manufacturers.

36. The authentification method of claim 32 wherein at least one said web site is accessible from a directory for universal code subcomponents.

37. The authentification method of claim 32 wherein at least one said web site provides information about services provided by the creator.

38. The authentification method of claim 37 wherein said information about services provided by the creator is inclusive of information sufficient to place an order for services.

39. The authentification method of claim 32 wherein at least one said web site provides information about objects produced by the creator.

40. The authentification method of claim 39 wherein said information about services provided by the creator is inclusive of information sufficient to place an order for new product.

41. The authentification method of claim 39 wherein said information about services provided by the creator is inclusive of information sufficient to place an order for replacement parts.

42. The authentification method of claim 39 wherein said information about services provided by the creator is inclusive of information sufficient to place an order for refills.

43. The authentification method of claim 1 wherein multiple creators are each recognized with a unique origin code component.

44. The authentification method of claim 43 wherein multiple creators are each recognized with a unique origin code component in the same registry.

45. The authentification method of claim 33 wherein multiple creators are each recognized with a unique origin code component in a registry particular to one origin code component connected in a network comprised of other registries.

46. The authentification method of claim 43 wherein multiple creators are each recognized with a unique origin code component in the same registry connected in a network with at least one other registry.

47. The authentification method of claim 43 wherein each said origin code component includes a universal code subcomponent relating to the type of creator by category.

48. The authentification method of claim 47 further including the step of recording in computer memory registry a directory of universal code subcomponents with information relating to a categorization of recognized creators.

49. The authentification method of claim 43 wherein said plurality of objects upon which origin and authentification code components is each printed is comprised of titled financial notes.

50. The authentification method of claim 49 wherein one said status condition indicates ownership by the recognized possessor of the title.

51. The authentification method of claim 43 wherein said plurality of objects upon which said origin and authentification code components is each printed is comprised of works of art.

52. The authentification method of claim 51 wherein three different status conditions are utilized: 'creator'; 'dealer', authorized purveyor; and 'public'.

53. The authentification method of claim 51 wherein four different status conditions are utilized: 'creator'; 'dealer', authorized purveyor; 'public'; and 'private' which indicates registered ownership by entrance of said secret ownership code subcomponent.

54. The authentification method of claim 43 wherein said plurality of objects upon which origin and authentification code components is each printed is comprised of mass produced manufactured goods.

55. The authentification method of claim 54 wherein both human and machine readable origin and authentification code components are printed upon said mass produced manufactured goods.

56. The authentification method of claim 55 wherein said machine readable origin and authentification code components are printed utilizing Magnetic Ink Character Recognition (MCR).

57. The authentification method of claim 55 wherein said machine readable origin and authentification code components are printed utilizing bar code.

58. The authentification method of claim 54 wherein three different status conditions are utilized: 'manufacturer', as creator; authorized purveyor; and public.

59. The authentification method of claim 58 wherein four different status conditions are utilized: 'manufacturer', as creator; authorized purveyor; public; and private which indicates registered ownership by entrance of said secret ownership code subcomponent.

60. The authentification method of claim 54 wherein four different status conditions are utilized: 'manufacturer', as creator; distributor, retailer; and public.

61. The authentification method of claim 60 wherein five different status conditions are utilized: 'manufacturer', as creator; distributor, retailer; public; and private which indicates registered ownership by entrance of said secret ownership code subcomponent.

* * * * *

UNITED STATES PATENT AND TRADEMARK OFFICE
CERTIFICATE OF CORRECTION

PATENT NO.     : 6,463,541 B2                                        Page 1 of 1
DATED          : October 8, 2002
INVENTOR(S)    : Hu It is certified that error appears in the above-identified patent and that said Letters Patent is hereby corrected as shown below:

Title page,
Item [76], change "04463" to -- 104463 --

Signed and Sealed this

Second Day of December, 2003

JAMES E. ROGAN
*Director of the United States Patent and Trademark Office*